United States Patent [19]

Zolt

[11] 4,387,453
[45] Jun. 7, 1983

[54] TURNTABLE SYSTEM WITH LOW AGGREGATE RESONANCE

[76] Inventor: David M. Zolt, 2338 Golfview, Troy, Mich. 48084

[21] Appl. No.: 168,682

[22] Filed: Jul. 11, 1980

Related U.S. Application Data

[63] Continuation-in-part of Ser. No. 16,091, Feb. 28, 1979, Pat. No. 4,225,142.

[51] Int. Cl.³ ............................................ G11B 25/04
[52] U.S. Cl. .................................................... 369/263
[58] Field of Search ................ 369/264, 263, 247, 248

[56] References Cited

U.S. PATENT DOCUMENTS

| | | | |
|---|---|---|---|
| 2,572,969 | 10/1951 | Bacon et al. | 248/638 X |
| 2,927,795 | 3/1960 | Drake | 369/263 |
| 3,047,297 | 7/1962 | Drake | 369/263 |
| 3,048,408 | 8/1962 | Morgan | 369/263 |
| 3,214,177 | 10/1965 | Geiger | 369/269 |
| 3,510,137 | 5/1970 | Freier | 369/263 |
| 4,202,551 | 5/1980 | Darnall | 274/39 R |

FOREIGN PATENT DOCUMENTS

| | | | |
|---|---|---|---|
| 2547849 | 5/1976 | Fed. Rep. of Germany | 369/263 |
| 334679 | 9/1930 | United Kingdom | 369/263 |
| 1399525 | 7/1975 | United Kingdom | 369/263 |

*Primary Examiner*—Harry N. Haroian
*Attorney, Agent, or Firm*—Gifford, VanOphem, Sheridan & Sprinkle

[57] ABSTRACT

A high fidelity turntable system with low aggregate resonance is disclosed. The turntable system comprises a tone arm assembly and a belt-driven platter assembly joined rigidly by a silent substructure of pure aluminum tubing and other shapes. This low acoustic mass substructure is internally damped beyond its resonance point and is resiliently suspended from a base plate in a mounting cabinet to isolate the turntable system for substantially all resonant feedback. The acoustic mass of the turntable system and, consequently, the resonance, is further reduced by decoupling the tone arm counterweight from the tone arm assembly by means of additional resilient elements.

6 Claims, 6 Drawing Figures

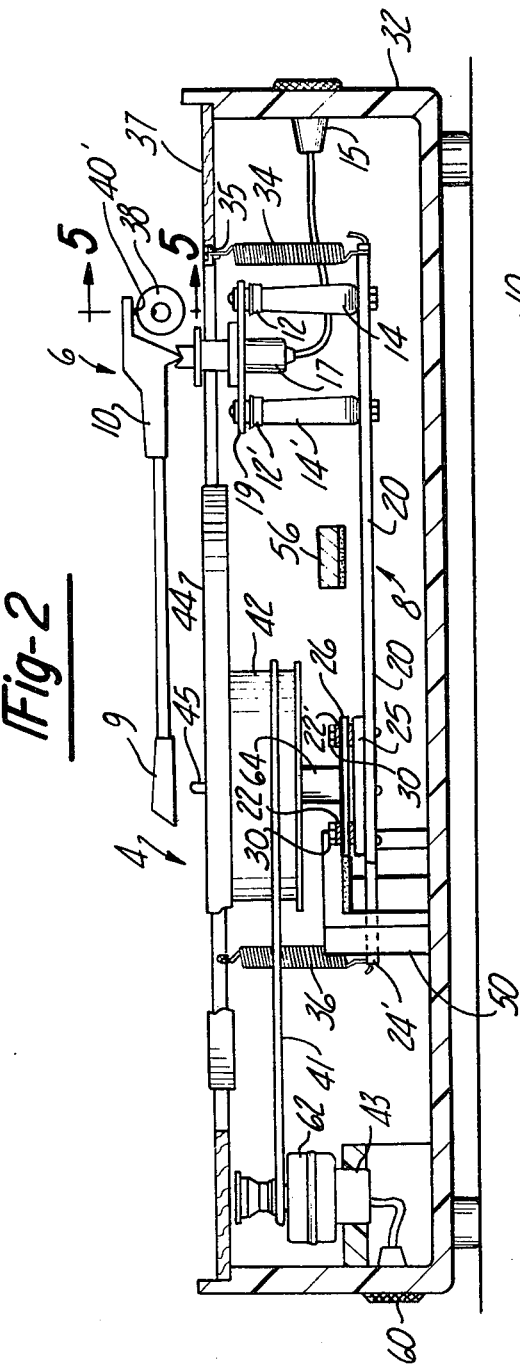

TURNTABLE SYSTEM WITH LOW AGGREGATE RESONANCE

BACKGROUND OF THE INVENTION

Cross Reference

This application is a continuation-in-part of my U.S. patent application Ser. No. 016,091, entitled Turntable System With Low Aggregate Resonance, filed on Feb. 28, 1979, and now U.S. Pat. No. 4,225,142.

I. Field of the Invention

The invention pertains generally to high fidelity turntable systems and is more particularly directed to a low aggregate resonance substructure for mounting such systems.

II. Description of the Prior Art

Turntable designers in the past have exerted much concentration on reducing acoustic distortions in high fidelity systems. Their efforts have primarily been directed to decreasing such distortions as wow and flutter, which are speed inconsistencies, or rumble, which is the basic noise level inherent in the rotating motion of a system that is received by a phonographic cartridge during play. So much success has been achieved in alleviating these two distortions that they have virtually been eliminated as problems to the serious audiophile.

One acoustic distortion problem for which much less progress has been made is resonance. This serious distortion can be described and summarized as the sounds produced by the substances of which the turntable system is constructed. Further, depending upon the acoustic and mechanical coupling of the turntable to its environment, these substances may also include the objects on which the turntable is mounted or even resting. The resonant sounds produced by these substances are created by and amplified along with the musical or other information that the phonographic cartridge is processing, thereby producing distortion. The problem usually manifests itself as a "thump" or a loss of fidelity in the lower, or even middle, frequencies and is sometimes referred to as "one note bass".

Generally, the cause of the problem is accepted as being one of feedback, as the turntable substances will not make sounds by themselves. Thus, it is the excitation of these substances by the sound itself which produces the resonance and consequent distortion.

It is believed that there are three principal feedback paths in a turntable system. The first is through the air from the acoustic energy produced by the speakers to the turntable. Energy in the form of sound vibrations excite the turntable system construction through this acoustic path to produce a resonant distortion.

The second principal path is a mechanical one whereby the mechanical vibrations of the speakers and the vibrations caused by their acoustical energy in other surrounding objects are coupled back through any solid object in contact with the mounting structure of the turntable. The closer the speaker is to the turntable system and the more direct the mechanical coupling, the more distortion this feedback path creates.

The third path which has not been previously compensated or described is an inherent feedback path where the actual sound vibrations produced by the cartridge transducing the stylus motion into electrical signals provide an excitation for the resonant substances comprising the turntable.

Generally, the prior art has attempted to solve these resonance problems by providing a very high mass structure for mounting the turntable assembly and by decoupling this high mass structure from the environment with resilient members such as springs. The high mass structure will require more acoustic energy to resonate and, thus, will alleviate the acoustic feedback while the decoupling springs will isolate the high mass structure from mechanical vibration and substantially limit the mechanical feedback.

The high mass of the turntable supporting structure, however, may exacerbate the inherent feedback as there is a greater amount of physical material present to be heard by the tone arm assembly. Further, a massive mounting structure is bulky to handle and necessitates a stronger and more expensive set of decoupling springs.

In addition, many modern amplification systems have equalization factors where lower notes are amplified more than higher notes. This is to compensate the method used for the mechanical recording medium where lower notes produce less physical movement of the stylus and, thus, less signal. Lower resonant tones will, consequently, be amplified, along with low note information, more than the higher resonant tones. It would, therefore, be highly desirable to eliminate as much of the low resonant feedback from a turntable system as possible, even to the extent of increasing the high resonant tones.

SUMMARY OF THE INVENTION

Therefore, it is a primary object of the present invention to alleviate these problems found in the prior art and more fully compensate a turntable system for all three feedback paths.

Another object of the invention is to provide a rigid, low resonance connecting substructure for the tone arm assembly and the platter assembly of a high fidelity turntable.

A further object of the present invention is to provide a tone arm assembly in which the counterweight mass is decoupled acoustically from the tone arm.

Still another object of the invention is to provide a rigid, quiet substructure which is mechanically decoupled from the mounting structure of the turntable assembly.

In accordance with the above-stated objects of the invention there is provided a turntable system having a platter assembly and tone arm assembly connected by a substructure comprising three tubular struts radially outreaching from the platter assembly rotation axis. Preferably, the tubular substructure is constructed of a material which has a high strength-to-mass ratio and is an acoustic substance. In the preferred embodiment, this acoustic substance is pure aluminum tubing which is resonant at frequencies in the high audio range with higher tonal qualities and harmonics. Such a substance is easily damped beyond its resonance point by an internal damping substance. In the implementation shown, a dense foam rubber is packed tightly inside each supporting strut for such damping.

I have found that substructures having nontubular shapes also render somewhat improved results if the substructure is internally damped. Thus, although tubular substructures represent the best results achieved to date for my invention, other forms of the invention also provide a noticeable improvement over the prior art.

In this manner, any acoustic or inherent feedback received by the low mass structure is damped by the foam rubber and the system reliably quieted by this method. The low mass substructure is also not resonant to low acoustic notes and low inherent notes and, therefore, they are not over-amplified or heard. The higher notes that would be heard without the internal damping of the supporting structure are easily dissipated by the provision of the internal damping substance.

Further, the counterweight of the tone arm assembly is acoustically decoupled by resilient means to provide more inherent feedback decoupling. The counterweight mass, if isolated from the system, will not be heard and will produce an even quieter system.

The substructure is resiliently mounted by extension springs from a base plate of a mounting cabinet to decouple the system from any mechanical or inherent feedback loop. The extension springs are more effective decouplers than compression springs due to the ability of the system to use a lower spring rate and can be further provided with internal foam rubber damping in their flexible, resonant coils. In this manner, the turntable system floats on the three struts or other shape of the substructure and all three feedback paths have been effectively damped or decoupled.

The rigid connection between the platter assembly and tone arm assembly is important for the fidelity of the reproduction of the information on the recording disk. Distortion or loss of information can be introduced into the system if the tone arm assembly, and, thus, the cartridge, moves in a dissimilar mode to the platter assembly or recorded information. The present substructure, therefore, provides a rigid connection necessary for coupling these assemblies without introducing resonant distortion.

These and other objects, features, and advantages of the invention will be clearer and more fully understood from a reading of the detailed description when taken in conjunction with the appended drawings wherein:

BRIEF DESCRIPTION OF THE DRAWINGS

FIG. 2 is a longitudinal cross-sectional side view along section line 2—2 of FIG. 1;

FIG. 3 is a cross-sectional end view along section line 3—3 of FIG. 1;

FIG. 4 is a fragmentary perspective view of a typical suspension mounting for the system illustrated in FIG. 1;

FIG. 5 is a cross-sectional view along section line 5—5 of the counterweight illustrated in FIG. 2.

DETAILED DESCRIPTION OF THE PREFERRED EMBODIMENT

Figure 1:
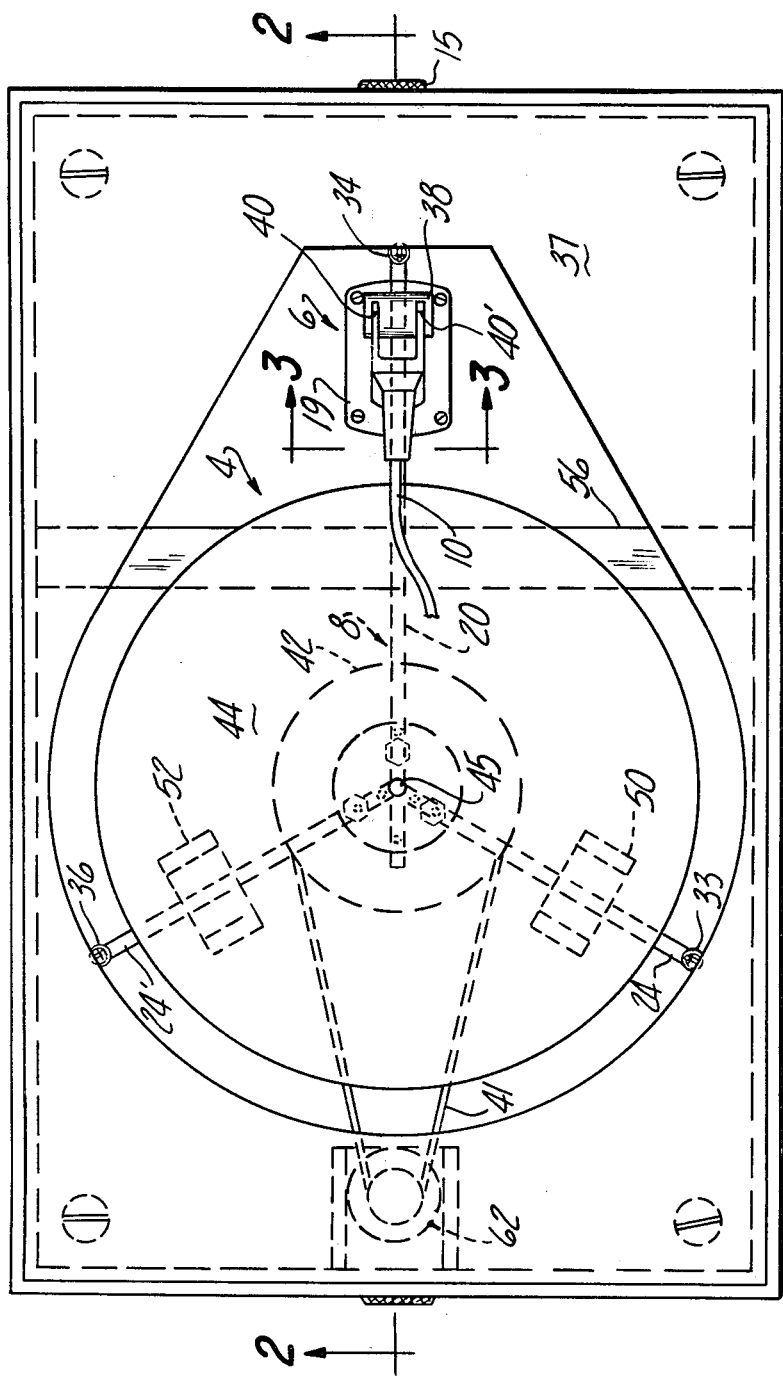
FIG. 1 is a top plan view of the preferred embodiment of a turntable system constructed in accordance with the invention.

Referring now to FIGS. 1 and 2, there is shown a high fidelity turntable system comprising a tone arm assembly 6 and platter assembly 4 rigidly connected by a substructure 8. The tone arm assembly 6, which has a phonographic cartridge 9 cantilevered on the tone arm 10 and balanced by a counterweight 38, is for providing an electrical signal representative of the mechanical motion of a stylus on a recording surface, as is conventional in the art. The electrical signals pass through connecting wires from the cartridge to a connector 15 and may be then transmitted to an amplifier. Preferably, tone arm assembly 6 is commercially available as a SME Model 3009, Series III.

A mounting pillar 17 is upwardly standing in a rectangular plate 19 which is balanced on a pair of U-shaped mounting members 14 and 14', respectively. Each of the mounting members 14, 14' (as better seen in FIG. 3) are tubular and bent into the U-shape by suitable means to form two arms which have affixed at each end a mounting block 12, 12' which are adapted to receive screws through drilled apertures in the rectangular base plate 19. Grommets 2, 2' are inserted in the apertures between the plate and screws to break one part of the feedback path between the base plate and the substructure by sitting on the mounting blocks and isolating the connecting structure from the U-shaped mounting members.

Each of the U-shaped mounting members, 14, 14', are connected to a main tubular support strut 20 by means of a single metal screw 21, and conventionally fixed by a nut.

The main tubular support strut 20 extends to a point beneath the platter assembly 4 where it is connected to a disk-shaped plate 25, preferably with two small metal screws. The plate 25 also has mounted, in a similar manner by two small screws, tubular struts 24, 24' which connect at an angle to provide an equiangular mounting structure. The three struts are equal angularly provided as radial extensions from the rotational axis of the platter assembly 4 for balance and support, with the least number of elements.

The struts are preferably constructed of an acoustic material that has a very high strength-to-mass ratio so they may provide a low resonance structure with adequate structural support. The struts, being tubular, are closed upon themselves and have no open vibratory surfaces. Thus, vibrations will be transmitted along the longitudinal axis of the strut. Each tubular strut is provided with an internal damping 64 (see FIG. 4), preferably dense foam rubber, that will quickly dissipate vibrations and resonances that are excited in the material. In this implementation, very pure aluminum tubing is utilized, and the high tonal qualities and harmonics that might be excited and transmitted in this substance are easily damped out and not heard by the tone arm. Thus, a rigid substructure that has a low aggregate resonance has been shown in accordance with one of the objects of the invention.

Each tubular strut is isolated from the mechanical and inherent feedback path by an extension spring 34, 36, 33 (see, for example spring 34 in FIG. 4). The struts are decoupled from a base plate 37 by hooking one end of the extension spring 34 over an eyelet 35 screwed into the plate, and the other end of the spring through a drilled hole in the end of the tubular strut 20. The base plate 37 mounts in a peripheral ridge in a mounting cabinet 32 to allow the system to float free of mechanical disturbances.

Because of the lower mass and resonance of the substructure 8, less resilient springs must be used. Also, the springs can be provided as extension rather than compression springs which will produce even more effective decoupling of the mechanical feedback path. A natural oscillation frequency of approximately 2-3 Hz. will produce the most effective decoupling and the springs may further be damped internally with a dense foam rubber material.

The lower the frequency of the oscillation of the mass and spring combination, the greater will be the decoupling. The decoupling is effective when between the natural frequencies of the platter assembly and the tone arm assembly which are generally 8 Hz. and 1.5 Hz., respectively.

Figure 6:
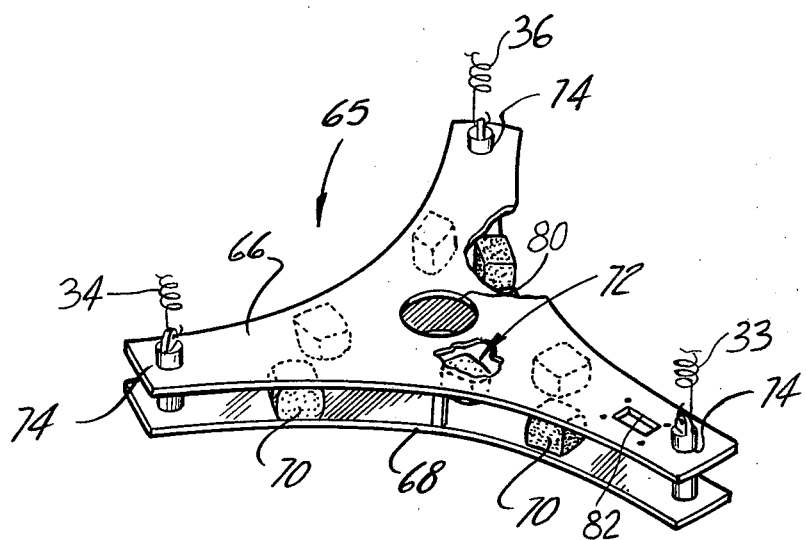
FIG. 6 is a perspective view of an alternate internally damped substructure according to the present invention.

FIG. 6 depicts a substructure 65 alternative to the tubing depicted in FIGS. 1-4. The substructure 65 is shown in the form of an inwardly tapered triangle, but other shapes are suitable for the invention so long as the overall mass of the substructure is maintained at a minimum and the substructure is formed of a suitable material as outlined above.

Substructure 65 is formed of two plates, preferably very pure aluminum plates, 66 and 68. Sandwiched at several positions between the plates 66 and 68 are damping materials, preferably dense, foam rubber. Such damping materials are shown at 70 and in the broken section at 72 near the inner central portion between plates 66 and 68. Drilled holes 74 are provided at the corner portions of substructure 65 for attachment of extension springs 33, 34, 36 in the same manner as for the tubular struts. Although the substructure 65 is shown in FIG. 6 as open along its outside edges, it is also possible to form substructure 65 as a sealed low mass-to-strength ratio component with dense foam rubber damping positioned therein.

The extension springs 33, 34 and 36 are used to suspend the substructure 65 from the base plate 37 in the same fashion as the tubing 20 is suspended from the base plate in FIG. 4. The platter 4 (FIG. 2) is mounted in a central hole 80 of the substructure 65 while the tone arm assembly 6 (FIG. 2) is mounted to a rectangular hole 82 in the substructure 65.

Substructures in the form of parallel plates or other shapes and as depicted in FIG. 6 have also proved to be a suitable improvement over the prior art by effectively damping or decoupling the three feedback paths associated with excitation of the turntable substances by the sound system. It should also be understood that the invention is not limited to two plates or two members as depicted in FIG. 6. For example, the depiction in FIG. 6 may be formed as one piece with connecting walls between plates 66 and 68, it being understood that this is the equivalent of the two members 66 and 68 depicted in FIG. 6. Similarly, other shapes having one member with an internal space or two or more members with spaces therebetween are suitable equivalents so long as they are properly damped according to the invention.

The platter assembly 4 is positioned on the top side of the disk-shaped plate 25 by three hexagonally headed mounting bolts 30. The connection is isolated from the substructure by wrapping dense foam rubber 22, 22' around the mounting screws 30. In this manner, the screws 30 are not allowed to touch the platter assembly 4. This creates a mild but effective acoustic barrier for the transmission of vibration through the system and quiets part of the inherent feedback path. The hexagonal heads on the screws 30 are used to facilitate balancing and leveling the mounting with a wrench once the platter is assembled and placed in position.

The platter assembly 4 comprises the disk-shaped plate 25 screwed to a mounting plate 26 having an upwardly standing spindle 64 which has a bearing assembly for mounting a drive wheel 42, onto which a disk-shaped platter 44 may be placed. The platter assembly 4 sans the disk plate 25 was a component of an ERA MK6C Turntable.

The drive wheel 42 is operably driven by a flexible belt 41 that is slipped over the drive shaft of a vertically mounted motor 62 on an acoustic base 43. The motor 62 may be provided with suitable drive controls via connector 60. The flexibility of the drive belt 41 contributes to the reduction in resonance and noise, as vibrations from the motor are not transmitted readily through the elastic medium to the platter assembly. The drive pulley fitted on the shaft of the motor 62 is supplied with two differently sized tracks so that the drive belt 41 may be moved into either track depending on the speed selected for the recording.

When the platter 44 is removed, the substructure 8 will be lifted upward by the extension springs 33, 34, 36 on which it is suspended, and C-shaped holding blocks 50 and 52 are provided cross-wise to the radial struts to limit this movement. Likewise, a transverse bar 56 limits the upward movement of the main support strut 20. All the limiting structures 50, 52 and 56 can be equipped with small pads where they contact the struts of the substructure to prevent damage thereto.

Turning now to FIG. 5, in accordance with one of the objects of the invention, the counterweight for the tone arm has been decoupled acoustically from the mass of the turntable system by a pair of extension springs 40 and 40'. The counterweight 38, as preferably shown, is a cylindrically-shaped weight of the adequate mass to balance the tone arm 10 and provide the correct tracking pressure on a recording surface. The counterweight 38 is center-bored and has extension springs 40, 40' extending through two radial apertures to attach at one end to a dowel 39 located transversely within the center bore. The other ends of the extension springs 40, 40' attach over the finger-like projections of the tone arm to apply the counterbalancing force. In this manner the force of the counterweight 38 is apparent to the tone arm assembly 6 to provide the correct tracking pressure, but its mass is not heard by the system.

While the preferred embodiments of the invention have been shown, it will be obvious to those skilled in the art that modifications and changes may be made to the disclosed system without departing from the spirit and scope of the invention as defined by the appended claims.

What is claimed is:

1. A high fidelity turntable system for reproducing the sound recording on a disk, said system comprising:
   a cabinet,
   a platter adapted to support the disk and means for mounting said platter to said cabinet,
   a tone arm assembly carrying a phonograph cartridge and means for mounting said tone arm assembly to said cabinet,
   wherein said means for mounting said platter to said cabinet comprises:
   a first member,
   a second member and means for rigidly securing said second member to said first member so that at least a portion of the first member is spaced from at least a portion of the second member,
   acoustical decoupling means for attaching said first and second members to said cabinet,
   at least one damping member positioned in between and contacting said spaced portions of said first and second members, and
   means for rotatably mounting said platter to said first or second member.

2. The invention as defined claim 1 wherein said acoustical decoupling means comprises a plurality of springs extending between said cabinet and said first or second member.

3. The invention as defined in claim 1 wherein said springs depend downwardly from said cabinet and to said first or second member.

4. The invention as defined in claim 1 and comprising a plurality of acoustical damping members positioned between said first and second member.

5. The invention as defined in claim 1 wherein said tone arm mounting means comprises means for mounting said tone arm to said first or second member.

6. The invention as defined in claim 1 wherein said first and second members each comprise a plate, said first and second members being spaced apart and substantially parallel to each other.

* * * * *